(12) United States Patent
Matsuo (10) Patent No.: US 8,844,557 B2
(45) Date of Patent: Sep. 30, 2014

(54) FLOAT VALVE DEVICE

(75) Inventor: Shinichi Matsuo, Yokohama (JP)

(73) Assignee: Piolax Inc., Yokohama-shi (JP)

( * ) Notice: Subject to any disclaimer, the term of this patent is extended or adjusted under 35 U.S.C. 154(b) by 1295 days.

(21) Appl. No.: 12/242,969

(22) Filed: Oct. 1, 2008

(65) Prior Publication Data

US 2009/0084449 A1 Apr. 2, 2009

(30) Foreign Application Priority Data

Oct. 2, 2007 (JP) ................................. 2007-258389

(51) Int. Cl.
*F16K 24/04* (2006.01)

(52) U.S. Cl.
CPC .................................... *F16K 24/044* (2013.01)
USPC ............................................. 137/202; 137/43

(58) Field of Classification Search
USPC ................ 137/38, 41, 43, 171, 197, 199, 202
See application file for complete search history.

(56) References Cited

U.S. PATENT DOCUMENTS

| | | | |
|---|---|---|---|
| 5,582,198 A * | 12/1996 | Nagino et al. ................... | 137/43 |
| 6,035,884 A * | 3/2000 | King et al. ...................... | 137/202 |
| 6,170,510 B1 * | 1/2001 | King et al. ...................... | 137/202 |
| 6,405,747 B1 * | 6/2002 | King et al. ...................... | 137/202 |
| 6,592,100 B2 * | 7/2003 | Chou et al. ...................... | 251/144 |
| 6,843,268 B2 * | 1/2005 | Yamada et al. ................. | 137/202 |
| 6,854,477 B2 * | 2/2005 | Yamada et al. ................. | 137/202 |
| 6,901,943 B2 * | 6/2005 | Yamada et al. ................. | 137/202 |
| 6,941,966 B2 * | 9/2005 | Mori et al. ...................... | 137/202 |
| 6,981,514 B2 * | 1/2006 | Nishi .............................. | 137/202 |
| 7,168,441 B2 * | 1/2007 | Miyoshi et al. ................. | 137/202 |
| 7,770,593 B2 * | 8/2010 | Moses ............................. | 137/202 |
| 7,770,594 B2 * | 8/2010 | Kishi .............................. | 137/202 |

FOREIGN PATENT DOCUMENTS

| | | |
|---|---|---|
| JP | 7-279789 A | 10/1995 |
| JP | 07257204 A | 10/1995 |
| JP | 2007-203789 A | 8/2007 |

OTHER PUBLICATIONS

Japanese Office Action dated Aug. 2, 2011 (and English translation thereof) in counterpart Japanese Application No. 2007-258389.
Korean Office Action dated May 30, 2014 issued in counterpart Korean Application No. 10-2008-0095881.

* cited by examiner

*Primary Examiner* — Craig Schneider
(74) *Attorney, Agent, or Firm* — Holtz Holtz Goodman & Chick PC (57) ABSTRACT

A space in a housing is defined into a lower space and an upper space by a partition wall, and an opening portion is provided in the partition wall. A vertically slidable float is housed in the lower space of the housing and on an upper portion of the float, a movable valve is mounted so as to be movable relatively to the float in a vertical direction and a lateral direction. A protruding portion is provided on the upper portion of the float, and a receiving portion on which the protruding portion abuts is provided on a lower surface of the movable valve. A center hole is provided in a center of the receiving portion. When the float comes up, a peripheral portion of a top portion of the protruding portion of the float is adapted to abut on an inner circumference periphery of the center hole.

7 Claims, 8 Drawing Sheets

FLOAT VALVE DEVICE

BACKGROUND OF THE INVENTION

1. Field of the Invention

The present invention relates to a float valve device configured so that a float can come up in a housing when a height of a liquid level of a liquid rises to thereby close an opening portion communicating with an outside when the liquid level reaches a predetermined height. In particular, the present invention relates to one suitable as a float valve device configured so as to dissipate fuel vapor contained in a fuel tank of an automobile to a canister, to prevent fuel from flowing outside of the fuel tank by closing the opening portion when a height of a liquid level of the fuel exceeds a predetermined value, and to regulate the fuel tank from being filled up at the time when the fuel tank is refueled.

2. Description of the Related Art

For example, in a fuel tank of an automobile, there is disposed a float valve device for preventing an inner pressure of the fuel tank from increasing by dissipating fuel vapor contained in the fuel tank to a canister disposed outside thereof, for preventing fuel from flowing outside of the fuel tank by closing an opening portion communicating with the canister when a height of a liquid level of the fuel exceeds a predetermined height, and for regulating the fuel tank from being filled up at the time when the fuel tank is refueled.

Japanese Patent Application Laid-Open No. Hei 07-279789 discloses, as such a float valve device, a liquid level control valve, which includes: a seat section (corresponding to a valve seat) including a first planar portion disposed in an opening portion of a fuel tank connected to one end of a passage in which the other end is connected to a canister; a valve member having a first planar portion abutting on the first planar portion of the seat section; and a float that floats in the fuel tank by buoyancy of the fuel, and pushes the valve member upward by a top portion thereof in response to a rise of a fuel level, and thereby allows the valve member to abut on the seat section, thus making it possible to close the opening portion of the fuel tank. It is further described that the valve member is engaged with the float so as to be freely movable relatively thereto, and that the top portion of the float includes a protruding portion formed of a three-dimensional curved surface formed on an upper central portion of the float.

The liquid level control valve of the above-mentioned in Japanese Patent Application Laid-Open No. Hei 07-279789 is configured so that the top portion of the float pushes the valve member upward, whereby the top portion of the float can be allowed to abut on the seat section and thereby can close the opening portion. Accordingly, even if a position of the float is inclined with respect to the opening portion owing to inclination and the like of a vehicle, the valve member movable relatively to the float abuts on the seat section so as to be adapted thereto, and accordingly, there is obtained an advantage that sealing performance can be stably obtained.

SUMMARY OF THE INVENTION

However, in the float valve device with such a structure as in the above-mentioned Japanese Patent Application Laid-Open No. Hei 07-279789, it has been found out that, when the float rises and abuts on the valve seat through an intermediation of the valve member, the top portion of the float strongly abuts on the valve member, causing a risk that a crack and the like may occur in the valve member. It has been found out that, in particular, in the case where this component (float valve device) is dropped while being handled at the time of being conveyed, the top portion of the float collides with the valve member, and makes a strong impact thereon, and accordingly, the above-mentioned risk of the crack is increased.

As measures for solving such a problem as described above, it is considered to thicken the valve member, thereby enhancing strength thereof. However, a space for disposing the valve member thus increased in size becomes necessary, and there has been a problem that the float valve device is increased in size.

Hence, it is an object of the present invention to provide a float valve device that pushes a movable valve by a protruding portion formed on an upper portion of a float, and to thereby close an opening portion, in which such a problem as a crack of the movable valve can be solved without thickening the movable valve or increasing the movable valve in size.

In order to attain the above-mentioned object, a first aspect of the present invention provides a float valve device, including: a housing having a cylindrical shape in general, and is separated into a lower space and an upper space through an intermediation of a partition wall, in which an air pipe that allows the upper space to communicate with an outside thereof is attached to an outer wall of the upper space, an opening portion is provided in the partition wall, a valve seat is formed on a lower surface of the opening portion, and a communication hole that allows the lower space to communicate with an outside thereof is formed in an outer wall of the lower space; a float that is disposed in the lower space of the housing to be vertically slidable, has a protruding portion provided on a center of an upper surface thereof, and comes up by a liquid flowing through the communication hole of the housing, in which the protruding portion is formed so that a center thereof is highest, and that a periphery thereof becomes gradually lower from the center; and a movable valve that is supported on an upper portion of the float to be freely swingable with respect to the float, has a receiving portion provided on a lower surface thereof, and has a center hole formed in a center of the receiving portion, in which the protruding portion of the float abuts on the receiving portion, and a periphery of a top portion of the protruding portion abuts on the center hole, in which the movable valve abuts on the valve seat to thereby close the opening portion when the float comes up to a predetermined height.

According to the above-mentioned first aspect, when the float rises and the protruding portion of the float abuts on the receiving portion of the movable valve, the periphery of the top portion of the protruding portion abuts on an inner circumference periphery of the center hole, and a contact area therebetween is increased. Accordingly, impact force when the protruding portion collides with the receiving portion is dispersed to a periphery of the center hole, and is avoided from being concentrated on one spot of the receiving portion. Further, flexibility is imparted to the receiving portion by the above-mentioned center hole, and the impact force when the protruding portion collides with the receiving portion is relieved. Therefore, even in the case where strong impact force caused by falling and the like acts on, for example, at the time of conveying components, a breakage such as the crack can be prevented from occurring in the movable valve.

A second aspect of the present invention provides the float valve device according the first aspect, in which a guiding recessed portion that becomes gradually shallower toward an outer circumference thereof is provided on a periphery of the center hole of the receiving portion of the movable valve.

According to the second aspect, even if the float abuts on the receiving portion of the movable valve in a state of being inclined or shifting aside, the protruding portion of the float abuts on the center hole while being guided by the guiding recessed portion, and accordingly, the effect of relieving the above-mentioned impact force can be obtained more surely.

A third aspect of the present invention provides a float valve device according to the first aspect or the second aspect, in which a lightening recessed portion is formed on a periphery of the receiving portion of the movable valve.

According to the third aspect, the flexibility of the periphery of the receiving portion of the movable valve is enhanced, and the impact force when the protruding portion of the float collides with the receiving portion is further relieved, thus making it possible to prevent the breakage of the movable portion.

A fourth aspect of the present invention provides a float valve device according to any one of the first aspect to the third aspect, in which, above a plate portion on which the receiving portion of the movable valve is formed, an upper plate portion that is substantially parallel to the plate portion and constitutes a sealing surface is provided through an intermediation of a rib.

According to the fourth aspect, the upper plate portion that constitutes the sealing surface is provided above the plate portion on which the receiving portion is formed, through the intermediation of the rib. Accordingly, the flexibility between the sealing surface of the movable valve and the receiving portion is further enhanced, and the impact force when the protruding portion of the float collides with the receiving portion is relieved more effectively, thus making it possible to enhance the effect of preventing the breakage of the movable portion.

A fifth aspect of the present invention provides a float valve device according to the fourth aspect, in which a cavity is provided in a predetermined spot of the rib in a circumferential direction.

According to the fifth aspect, the cavity is provided in the rib that couples the plate portion on which the receiving portion is formed and the upper plate portion that constitutes the sealing surface to each other, whereby the flexibility between the sealing surface of the movable valve and the receiving portion is far more enhanced, and the impact force when the protruding portion of the float collides with the receiving portion is relieved more effectively, thus making it possible to enhance the effect of preventing the breakage of the movable portion.

According to the present invention, when the float rises and the protruding portion of the float abuts on the receiving portion of the movable valve, the periphery of the top portion of the protruding portion abuts on the inner circumference periphery of the center hole of the receiving portion. Accordingly, the impact force when the protruding portion collides with the receiving portion is dispersed to the periphery of the center hole, and is avoided from being concentrated on one spot of the receiving portion. Further, the flexibility is imparted to the receiving portion by the center hole. Therefore, even in the case where strong impact force caused by falling and the like acts on, for example, at the time of conveying components, the breakage such as the crack can be prevented from occurring in the movable valve.

BRIEF DESCRIPTION OF THE DRAWINGS

In the accompanying drawings.

FIGS. 5A to 5C illustrate a movable valve of the float valve device,
FIGS. 6A to 6D illustrate the movable valve of the float valve device,
FIGS. 8A to 8C illustrate functions of the float valve device.

DETAILED DESCRIPTION OF THE PREFERRED EMBODIMENTS

A description is made of an embodiment of a float valve device of the present invention with reference to FIG. 1 to FIG. 8C. Note that a float valve device 10 of this embodiment is disposed in a fuel tank of an automobile, and is used for dissipating fuel vapor contained in the fuel tank to a canister, for preventing fuel from flowing outside of the fuel tank by closing an opening portion when a height of a liquid level of the fuel exceeds a predetermined value, and for regulating the fuel tank from being filled up at the time of refueling.

Figure 1:
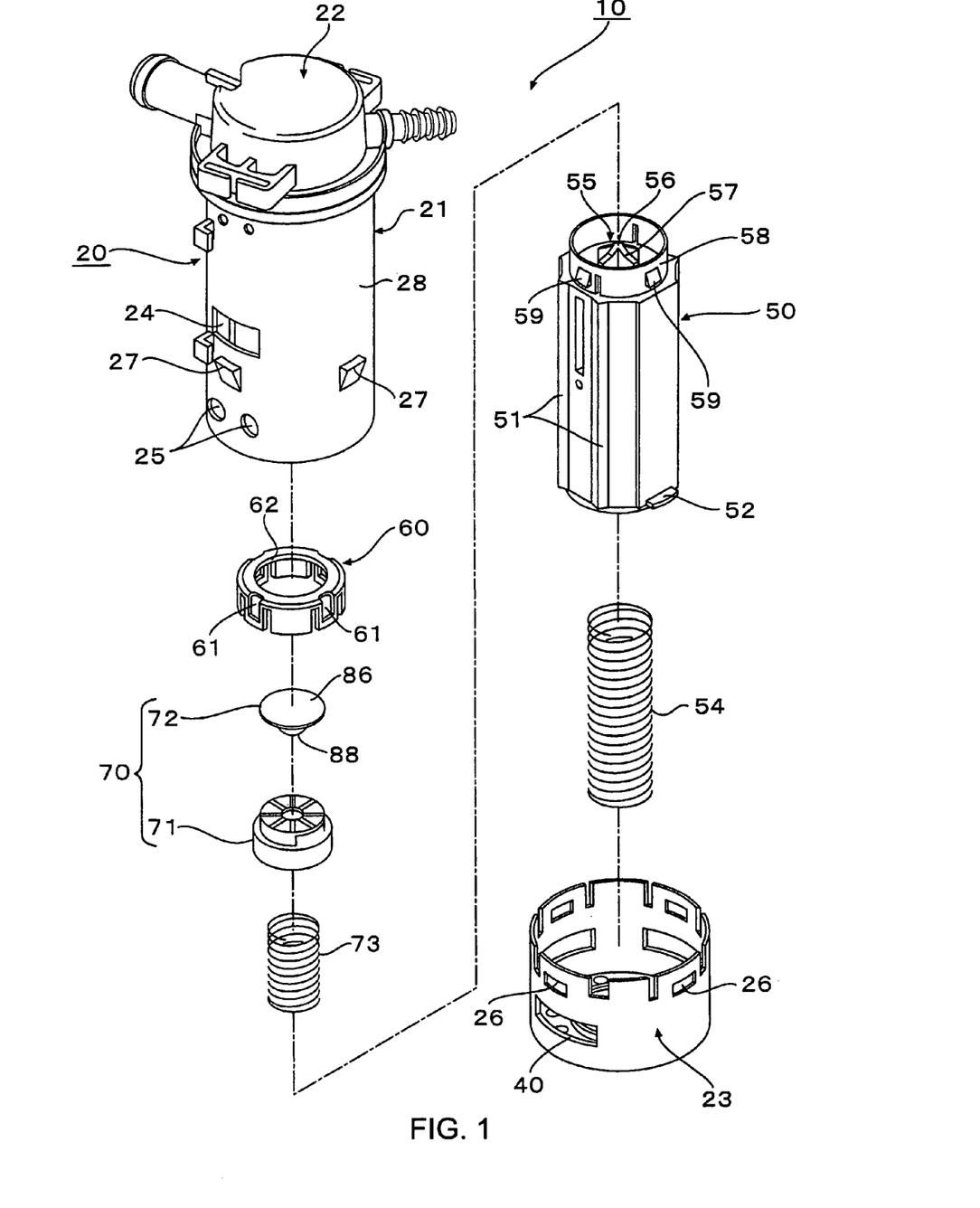
FIG. 1 is an exploded perspective view illustrating an embodiment of a float valve device according to the present invention.

As illustrated in FIG. 1, this float valve device 10 mainly includes: a housing 20 that generally forms a cylindrical shape; a float 50 disposed in the housing 20 so as to be vertically slidable; and a movable valve 70 attached to an upper portion of the float 50 so as to be movable relatively thereto.

The housing 20 includes: a housing body 21 that forms a substantially cylindrical shape in which an upper surface is closed; an upper cap 22 welded to the upper surface of the housing body 21; and a lower cap 23 fitted to a lower surface of the housing body 21.

The housing body 21 has rectangular communication holes 24 in a substantially intermediate portion of an outer circumferential wall 28 thereof and circular communication holes 25 in a lower portion of the outer circumferential wall 28. Further, on the lower portion of the outer circumferential wall 28, engagement hooks 27 to be fitted to engagement holes 26 of the lower cap 23 are formed.

Figure 2:
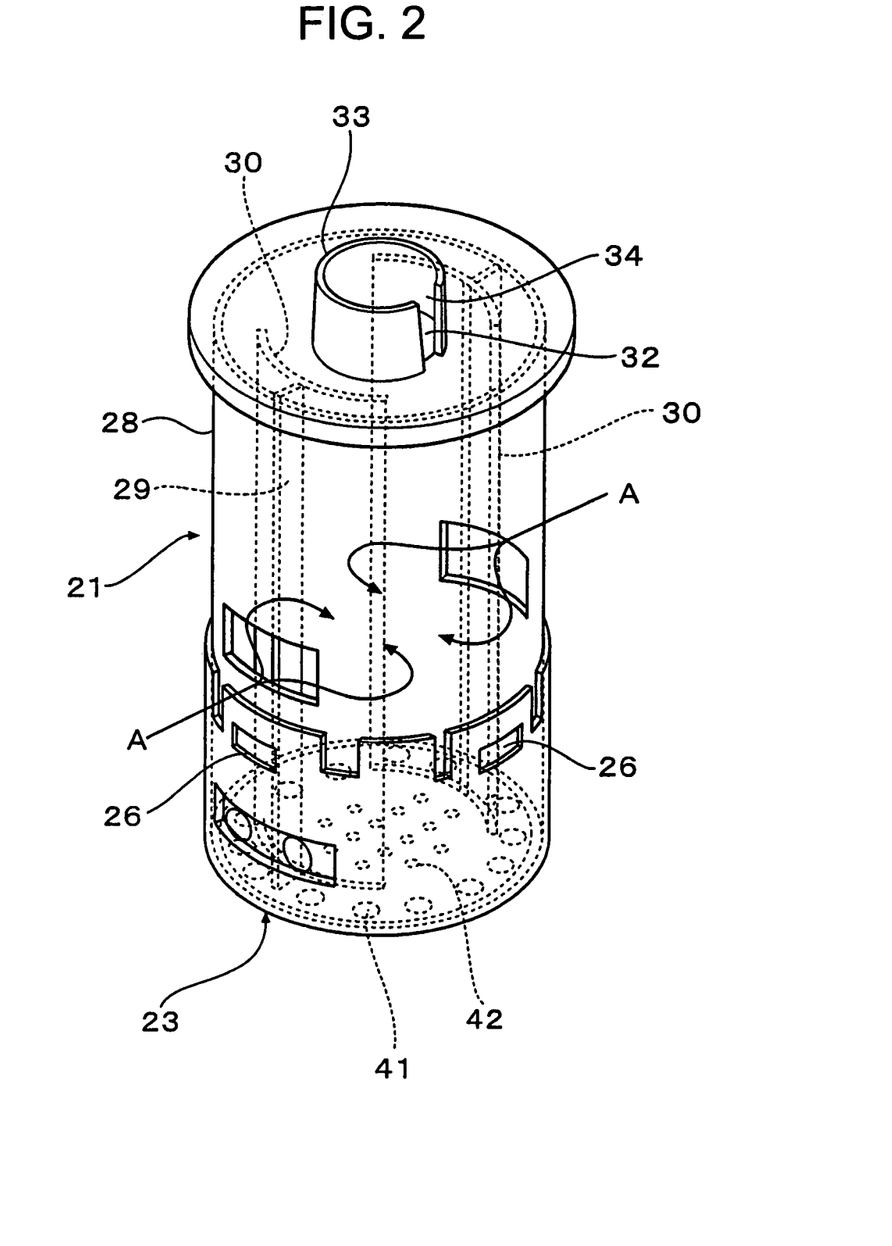
FIG. 2 is a perspective view illustrating a housing body and lower cap of the float valve device.

As illustrated in FIG. 2, in an inside of the outer circumferential wall 28, a pair of inner walls 30 each having a circular arc-shaped lateral cross section is arranged through an intermediation of rib-like coupling walls 29 extended in a cylinder axis direction so as to be opposed to each other in a circumferential direction. A space between the inner walls 30 serves as a gap into and from which the fuel flows and outflows. When referring to FIG. 3 in combination, each of the inner walls 30 has, on an inner circumferential surface thereof, a plurality of parallel ribs 45 extended in the cylinder axis direction, and is adapted to guide vertical slide of the float 50. Note that each of the coupling walls 29 is formed so as to split a left-and-right center of each of the communication holes 24. When the fuel enters the housing body 21 from the communication holes 24, as illustrated by arrows A of FIG. 2, the entering fuel collides with outer circumferences of the inner walls 30, is thereafter separated left and right to then go around the inner walls 30, and contacts the float 50. Accordingly, a situation can be prevented, in which the fuel directly abuts on the float 50, and lifts the float 50 by an impact caused thereby.

Further, the upper surface of the housing body 21 is closed by a partition wall 31, and an opening portion 32 is formed in a center portion of this partition wall 31. The opening portion 32 serves as a portion that allows communication between a lower space 46 surrounded by the housing body 21 and the lower cap 23 and an upper space 35 surrounded by the partition wall 31 of the housing body 21 and the upper cap 22. On a lower circumferential edge of the opening portion 32, a valve seat 32a that protrudes annularly is formed.

Further, on a circumferential edge of the opening portion 32, which is located on an upper surface of the partition wall 31, a cylindrical diaphragm 33 is protruded. On a part of this diaphragm 33 in the circumferential direction, a notch portion 34 is formed.

The upper cap 22 is welded onto the partition wall 31 of the housing body 21. When referring to FIG. 4 in combination, an air pipe 36 that is connected to a pipe (not shown) and is thereby allowed to communicate with the canister disposed outside of the fuel tank is formed integrally on the upper cap 22. A base end opening of the air pipe 36 forms an air hole 37 that communicates with the upper space 35. Note that the cylindrical diaphragm 33 formed on the partition wall 31 is positioned so that the notch portion 34 can be disposed at a position opposed to the above-mentioned air hole 37. Accordingly, when the float 50 jumps up and the fuel bursts out of the opening portion 32, a situation can be prevented, in which the fuel directly abuts on the air hole 37 and outflows into the air pipe 36.

Further, on the upper cap 22, a coupling pipe 38 that is allowed by a pipe (not shown) to communicate with a cutoff valve (not shown) through a pressure regulation valve is formed. However, the cutoff valve can also adopt a structure to independently communicate with the outside of the fuel tank through the pressure regulation valve, and in this case, it is not necessary to provide the coupling pipe 38. The cutoff valve discharges the fuel vapor and the like in the fuel tank to the outside thereof through the pressure regulation valve when a pressure in the fuel tank increases to a predetermined value or more even after the opening portion 32 is closed by the float valve device 10. In addition, when the liquid level of the fuel further rises, the cutoff valve closes an opening thereof to the pressure regulation valve, and inhibits the fuel from flowing outside.

The float 50 is formed of a substantially cylindrical member, and has, on an outer circumference thereof, a plurality of ribs 51 extended in the cylinder axis direction. By those ribs 51, the float 50 is held between the inner walls 30 of the housing body 21 so as to be vertically slidable. On an outer circumference of a lower end portion of the float 50, a pair of protrusions 52 (refer to FIG. 1) is formed so as to be opposed to each other in the circumferential direction. Those protrusions 52 are inserted into the gap between the inner walls 30, and regulate rotation of the float 50.

Figure 3:
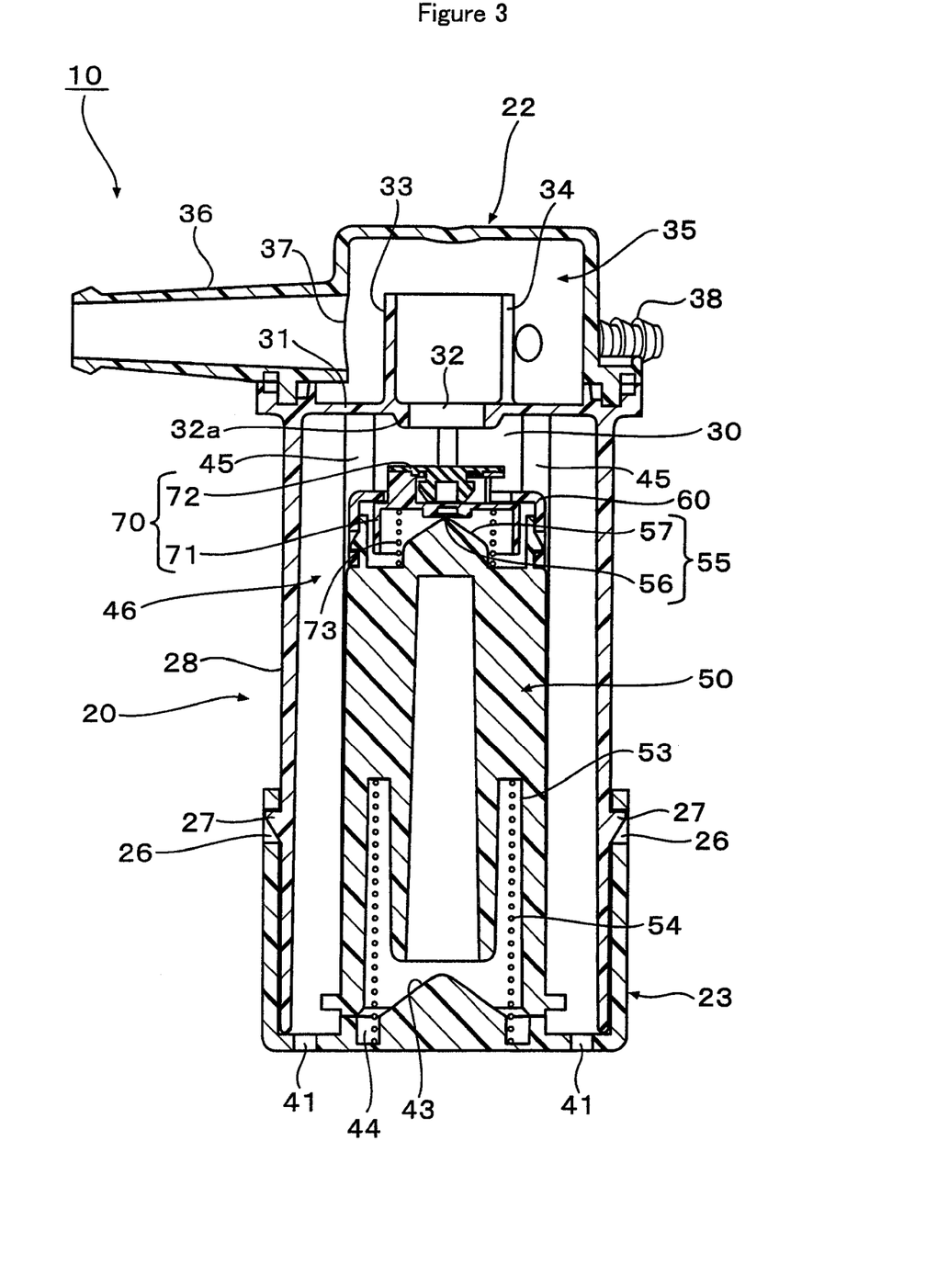
FIG. 3 is a longitudinal cross-sectional view of the float valve device.
Figure 4:
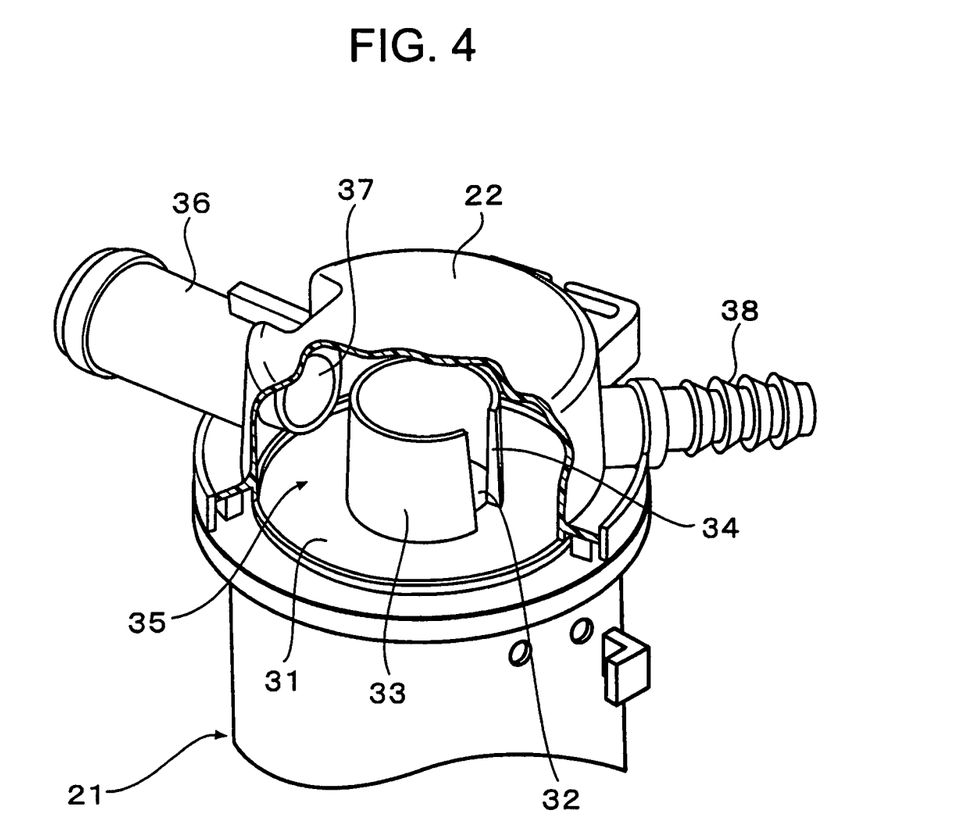
FIG. 4 is a partially cutaway perspective view of an upper cap of the housing of the float valve device.

As illustrated in FIG. 3, an annular recessed portion 53 is formed on a bottom surface of the float 50, and a float spring 54 is inserted into the recessed portion 53. Further, a lower end portion of the float spring 54 is inserted into and held by a receiving groove 44 formed on an outer circumference of a protruding portion 43 of the lower cap 23. The float spring 54 is in charge of imparting upward urging force to the float 50, and when a predetermined volume of the float 50 is immersed in the fuel, floating up the float 50 in cooperation with buoyancy of the float 50.

A protruding portion 55 is formed on a center of an upper surface of the float 50. The protruding portion 55 has a top portion 56 placed on a center thereof and a peripheral portion 57 which becomes lower toward an outer circumference of the protruding portion 55 from the top portion 56. Note that a shape of the protruding portion 55 may be, for example, a conic shape and a hemispheric shape, and further, the protruding portion 55 may include a plurality of ribs extended radially from the top portion 56 taken as a center. In this embodiment, the protruding portion 55 includes the plurality of ribs as illustrated in FIG. 1, and is formed into a shape having the peripheral portion 57 in which longitudinal cross sections of the respective ribs become lower toward the outer circumference from the top portion 56 as described above.

An annular rib 58 is formed on the outer circumference of the above-mentioned protruding portion 55 on the upper surface of the float 50. In this annular rib 58, a movable valve 70 described below is housed so as to be vertically slidable. On an outer circumference of the annular rib 58, a plurality of engagement hooks 59 (refer to FIG. 1 and FIG. 7) are formed.

Figure 7:
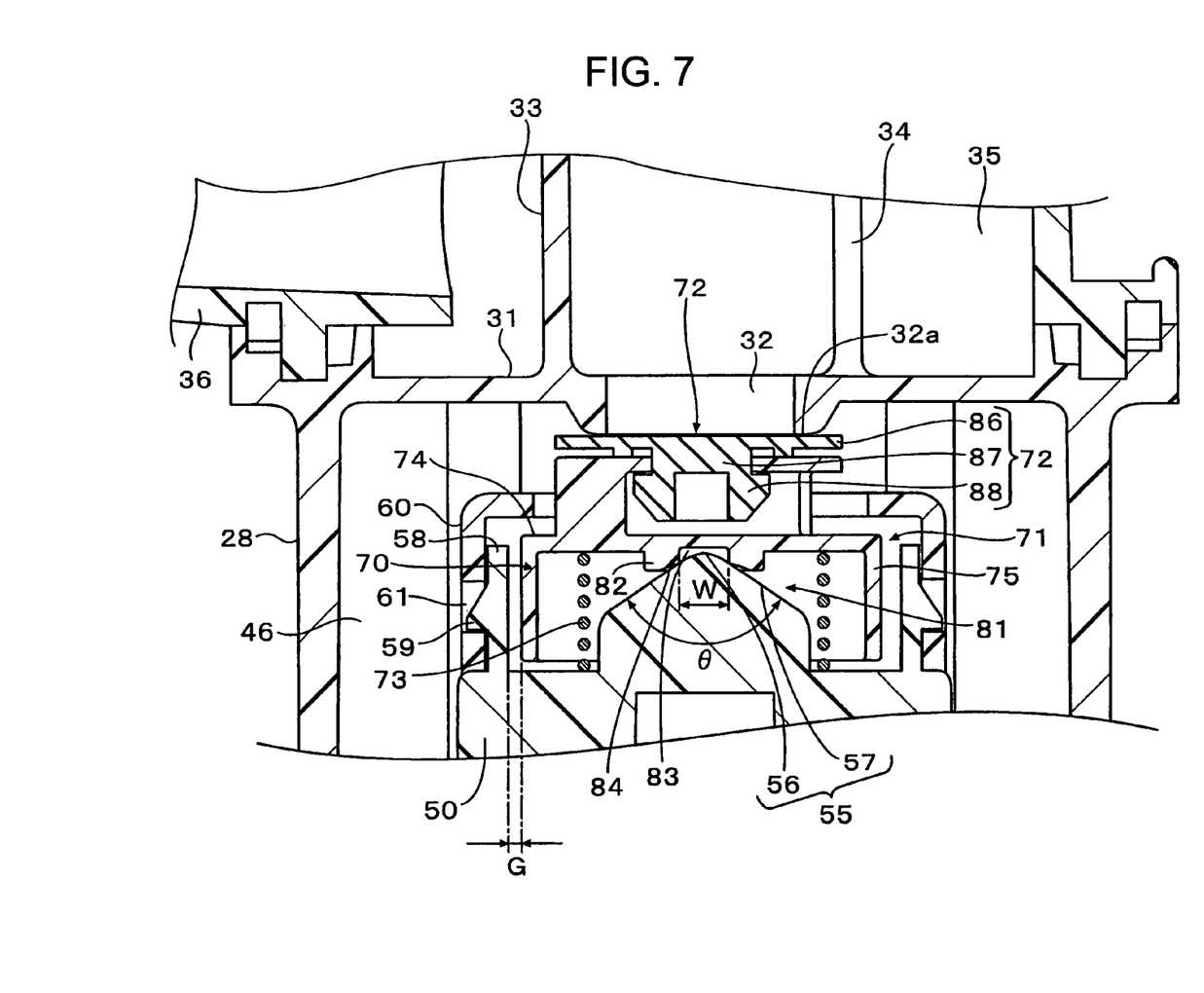
FIG. 7 is a partially enlarged cross-sectional view illustrating a portion in which a float, the movable valve, and a valve seat in the float valve device abut on one another.

Further, a holding cap 60 is adapted to be mounted on an outer circumference of the annular rib 58. This holding cap 60 has engagement holes 61 with which the above-mentioned engagement hooks 59 are to be engaged on an outer circumference thereof, and an opening portion 62 which allows an upper portion of the movable valve 70 described below to protrude therefrom on an upper surface thereof. The movable valve 70 is housed in the annular rib 58 of the float 50 through an intermediation of a valve body spring 73, and is fitted to the annular rib 58 by covering the annular rib 58 with the holding cap 60, thereby being held so as to be slidable vertically by a predetermined distance while always being urged upward. Note that, as illustrated in FIG. 7, between an outer circumference of the movable valve 70 and an inner circumference of the annular rib 58, a predetermined gap G is formed in a state where the movable valve 70 is disposed on a center of the annular rib 58. This gap G is formed to be larger than a gap between an outer circumference of the float 50 and the inner circumferences of the inner walls 30. Even when the float 50 moves in a lateral direction between the inner walls 30, the movable valve 70 is adapted to be capable of moving in the lateral direction by a distance longer than a moving distance of the float 50.

Figure 5A:
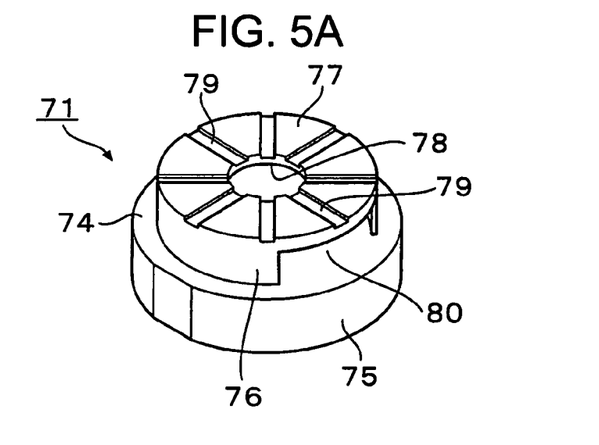
FIG. 5A is an upper perspective view of a body thereof.
Figure 5B:
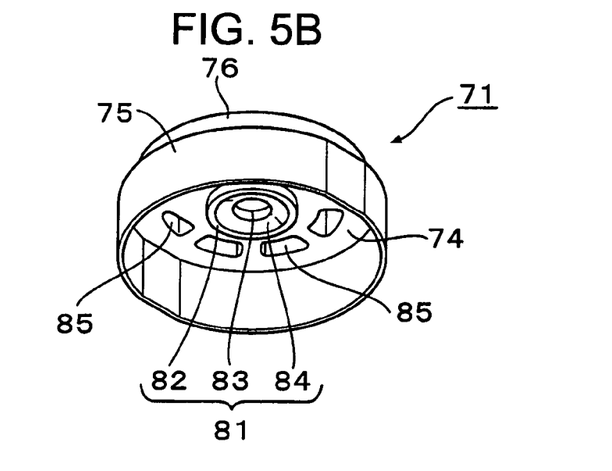
FIG. 5B is a lower perspective view of the body.
Figure 5C:
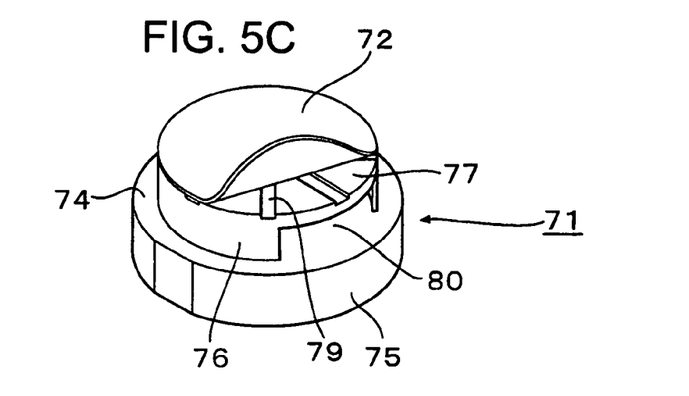
FIG. 5C is an upper perspective view of a state where a valve member is attached to the movable valve.

The movable valve 70 includes a body 71 and a valve member 72 mounted on an upper portion of the body 71. As illustrated in FIG. 5 to FIG. 6, the body 71 has a substantially circular plate portion 74 placed at an intermediate height thereof, a peripheral wall 75 extended downward from a peripheral edge of the plate portion 74, and an upper plate portion 77 formed on an upper surface of the plate portion 74 through an intermediation of a cylindrical rib 76. In a center of the upper plate portion 77, an attachment hole 78 for attaching the valve member 72 to the body 71 is formed, and air grooves 79 are formed radially from the attachment hole 78 toward an outer circumference of the upper plate portion 77. The air grooves 79 allow the air to enter a space between the valve member 72 and the upper plate portion 77, and prevent the valve member 72 from sticking to the upper plate portion 77 in the case where the valve is opening. As illustrated in FIG. 5C, the valve member 72 curls up, whereby the valve is adapted to open smoothly. The upper plate portion 77 and the valve member 72 constitute a sealing surface in the present invention. Further, in the cylindrical rib 76, a cavity 80 is formed in a predetermined direction. While this cavity 80 is necessary for demolding the body 71 after molding the body 71, the cavity 80 also contributes to imparting flexibility between the plate portion 74 and the upper plate portion 77.

Figure 6A:
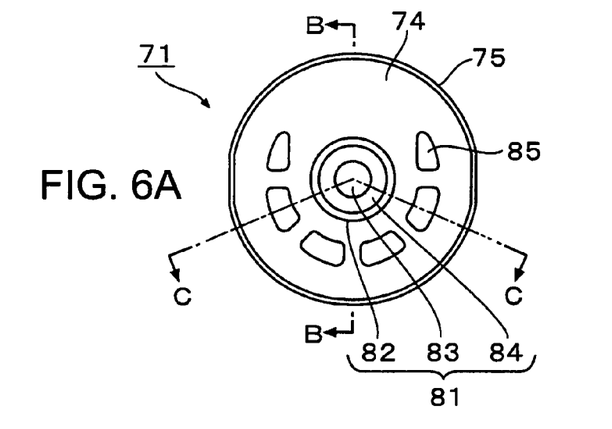
FIG. 6A is a bottom view of the body.
Figure 6B:
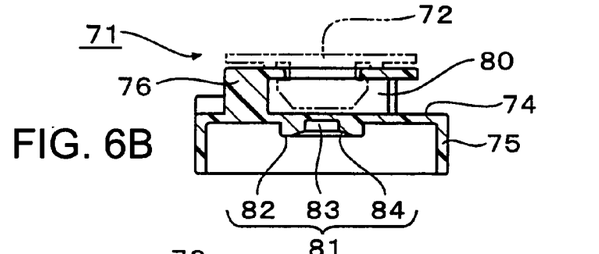
FIG. 6B is a cross-sectional view taken along an arrow line B-B of FIG. 6A.
Figure 6C:
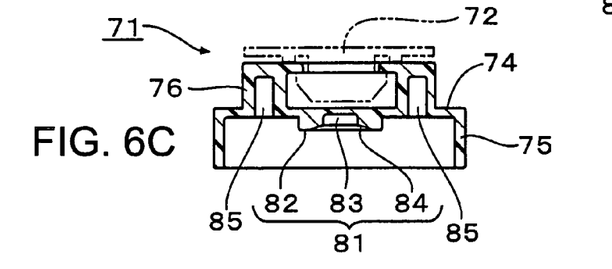
FIG. 6C is a cross-sectional view taken along an arrow line C-C of FIG. 6A.
Figure 6D:
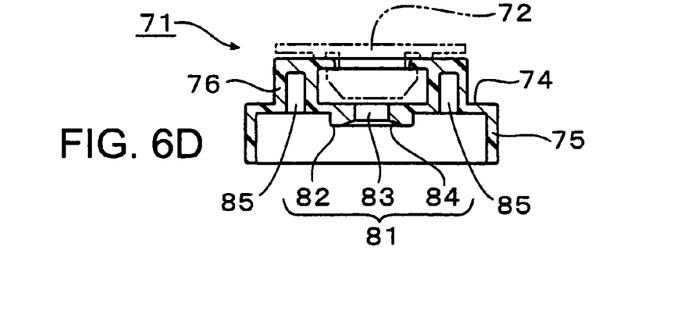
FIG. 6D is a cross-sectional view similar to FIG. 6C, illustrating another example in which a shape of a center hole is changed.

In a center of a lower surface of the plate portion 74, a receiving portion 81 on which the protruding portion 55 of the float 50 abuts is formed. The receiving portion 81 includes an annular protruding portion 82, a center hole 83 formed in a center of the annular protruding portion 82, and a guiding recessed portion 84 that becomes gradually shallower from the center hole 83 toward an outer circumference thereof. In this embodiment, as illustrated in FIGS. 6B and 6C, the center hole 83 includes a hole in which an inner bottom surface is closed. However, as illustrated in FIG. 6D, the center hole 83 may be a hole that penetrates the plate portion 74, and a center hole in the present invention means both of recessed and penetrating holes as described above. Note that the guiding recessed portion 84 just needs to be formed into a shape becoming gradually shallower from the center hole 83 toward the outer circumference thereof. For example, recessed portions of a conic shape, a spherical shape, and the like are preferably adopted.

As illustrated in FIG. 7, it is preferable that the center hole 83 have an inner diameter W that allows a periphery of the top portion 56 of the protruding portion 55 of the float 50 to abut on the center hole 83 by a relatively wide outer circumference. Specifically, it is preferable that the inner diameter W be set at approximately 2 to 6 mm. Further, when a longitudinal cross section of the protruding portion 55 of the float 50 forms a mount shape, it is preferable that an angle θ made by the peripheral portion 57 of the protruding portion 55 be set at approximately 90 to 150 degrees in order that the protruding portion 55 can effectively abut on the center hole 83.

On a periphery of the receiving portion 81 on the lower surface of the plate portion 74, a plurality of lightening recessed portions 85 are formed. The lightening recessed portion 85 contributes to imparting flexibility to the periphery of the receiving portion 81, and also prevents a shrink mark at the time of molding.

The valve member 72 is made of an elastic member such as synthetic rubber. As illustrated in FIG. 7, the valve member 72 has a flange portion 86, a shaft portion 87 extended from a center of a lower surface of the flange portion 86, and an engagement protruding portion 88 expanded on a tip end portion of the shaft portion 87. The valve member 72 is mounted on the upper plate portion 77 in such a manner that the engagement protruding portion 88 is forced and inserted into the attachment hole 78 of the upper plate portion 77, and is engaged with a back surface side of the attachment hole 78.

The movable valve 70 is urged upward by the valve body spring 73. The cylindrical rib 76, the upper plate portion 77, and the valve member 72 protrude upward from the opening portion 62 of the holding cap 60. However, the movable valve 70 may be one that is not urged upward, in which the valve body spring 73 is not provided.

Next, a description is made of functions of the float valve device 10.

Figure 8A:
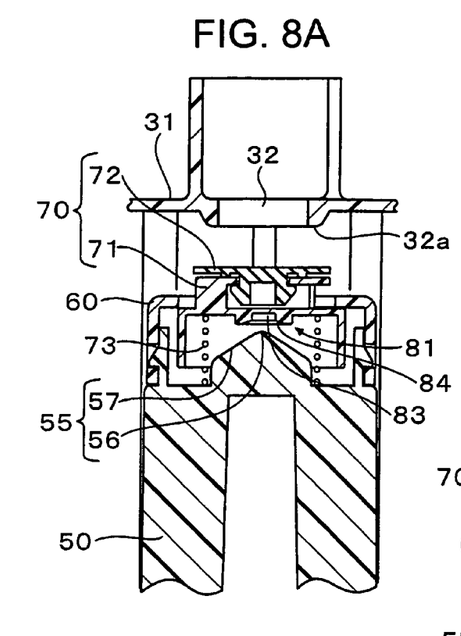
FIG. 8A is a partially enlarged cross-sectional view illustrating a state where the float is located at a descending position.

In a state where the liquid level of the fuel in the fuel tank is low, and the predetermined volume or more of the float 50 is not immersed in the fuel, as illustrated in FIG. 8A, the valve member 72 of the movable valve 70 does not abut on the valve seat 32a, and the opening portion 32 is opened. Therefore, the fuel vapor in the fuel tank enters the lower space 46 through the communications holes 24, 25, 41, and 42 of the housing 20, enters the upper space 35 through the opening portion 32, enters the air pipe 36 through the air hole 37, and is sent to the canister, which is disposed outside of the fuel tank, through the pipe (not shown).

Figure 8B:
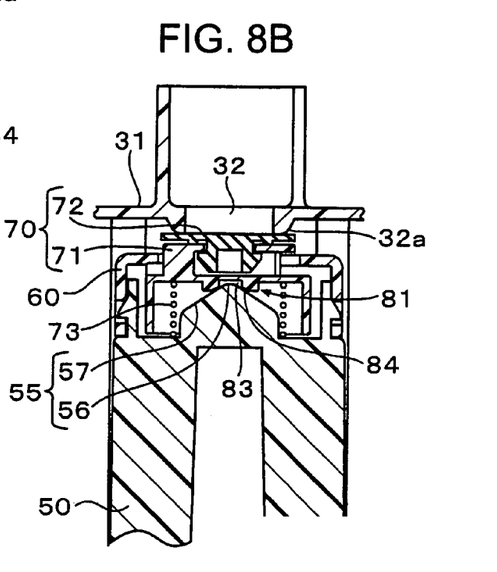
FIG. 8B is a partially enlarged cross-sectional view illustrating a state where the float comes up to close an opening portion.

Next, when the liquid level of the fuel in the fuel tank rises, and the predetermined volume or more of the float 50 is immersed in the fuel, as illustrated in FIG. 8B, by the buoyancy acting on the float 50 and the urging force of the float spring 54, the float 50 floats up, whereby the valve member 72 of the movable valve 70 abuts on the valve seat 32a, to thereby make the valve body spring 73 compressed. Further, the protruding portion 55 of the float 50 presses the receiving portion 81 of the movable valve 70, and brings the flange portion 86 of the valve member 72 into intimate contact with the valve seat 32a, thereby closing the opening portion 32. At this stage, the protruding portion 55 of the float 50 allows the periphery thereof to abut on the center hole 83 of the receiving portion 81 of the movable valve 70, and pushes the movable valve 70 upward.

Accordingly, for example, in a case where the fuel sways largely and the liquid level rises by cornering and the like of the automobile, the opening portion 32 is closed, whereby the fuel can be prevented from flowing into the upper space 35. Further, in a case where the liquid level rises to a predetermined height at the time of refueling, the opening portion 32 is closed so as to increase the inner pressure of the fuel tank, whereby the refueling can be stopped, and the fuel tank can be regulated from being filled up.

Figure 8C:
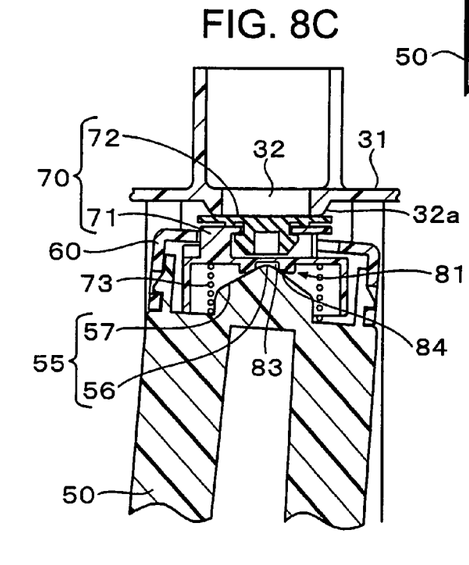
FIG. 8C is a partially enlarged cross-sectional view illustrating a state where the float comes up obliquely to close the opening portion.

Note that, for example, in the case where the fuel sways largely and the liquid level rises by the cornering and the like of the automobile, as illustrated in FIG. 8C, the protruding portion 55 of the float 50 is sometimes pushed upward from a direction inclined with respect to the valve seat 32a. In this case, the movable valve 70 is housed in the inner circumference of the annular rib 59 of the float 50 while making the gap G illustrated in FIG. 7 therebetween. Accordingly, the movable valve 70 is made capable of tilting with respect to the float 50 to some extent, and can bring the valve member 72 into intimate contact with the valve seat 32a even when the float 50 floats up from the direction inclined with respect to the valve seat 32a. Further, even in the case where the protruding portion 55 of the float 50 abuts obliquely on the receiving portion 81 of the movable valve 70, the top portion 56 of the protruding portion 55 can be guided to the center hole 83 by the guiding recessed portion 84, and the periphery of the top portion of the protruding portion 55 can be allowed to abut on the inner circumference periphery of the center hole 83.

Moreover, even in the case where the float 50 floats up while shifting in the lateral direction with respect to the center of the valve seat 32a, the movable valve 70 is made capable of moving in the lateral direction by the distance permitted by the above-mentioned gap G on the inner circumference of the annular rib 58. Accordingly, the top portion 56 of the protruding portion 55 can be guided to the center hole 83 by the guiding recessed portion 84, the periphery of the top portion of the protruding portion 55 can be allowed to abut on the inner circumference periphery of the center hole 83, and the valve member 72 of the movable valve 70 can be brought into intimate contact with the valve seat 32a.

Further, for example, in the case where the protruding portion 55 of the float 50 applies strong impact force to the receiving portion 81 of the movable valve 70 as a result that the fuel sways largely and the float 50 jumps up by the cornering and the like of the automobile, causing the protruding portion 55 of the float 50 to briskly collide with the receiving portion 81 of the movable valve 70, or as a result that a package containing the float valve device 10 is dropped during a period of conveying the float valve device 10 to a user or the like, the conventional float valve device has had a fear in that a crack and the like may occur in the receiving portion 81 of the movable valve 70 since a stress owing to the collision of the protruding portion 55 of the float 50 concentratedly acts on the receiving portion 81.

On the other hand, in the present invention, the peripheral portion 57 of the top portion 56 of the protruding portion 55 of the float 50 abuts on the inner circumference periphery of the center hole 83 of the receiving portion 81 of the movable valve 70. Accordingly, a contact area is increased, and the impact force when the protruding portion 55 collides with the receiving portion 81 is dispersed to the periphery of the center hole 83, and is avoided being concentrated on one spot of the receiving portion 81. Further, the flexibility is imparted to the receiving portion 81 by the center hole 83, and the impact force is weakened also thereby. Therefore, a breakage such as the crack can be prevented from occurring in the receiving portion 81 of the movable valve 70. Note that, in the present invention, it is preferable that the peripheral portion 57 of the top portion 56 of the protruding portion 55 be brought into linear contact with the inner circumference periphery of the center hole 83 of the receiving portion 81 of the movable valve 70. In accordance with this, the impact force applied to the receiving portion 81 of the movable valve 70 can be relieved effectively, and when the float 50 descends, the protruding portion 55 of the float 50 can be readily separated from the receiving portion 81 of the movable valve 70.

Further, in this embodiment, the lightening recessed portions 85 are formed on the periphery of the receiving portion 81 of the movable valve 70. Accordingly, the flexibility is imparted to the periphery of the receiving portion 81. Still further, above the plate portion 74 on which the receiving portion 81 of the movable valve 70 is formed, the upper plate portion 77 that is substantially parallel to the plate portion 74 through the intermediation of the rib 76 and includes the sealing surface is provided, and the valve member 72 is mounted on the upper plate portion 77. Accordingly, the flexibility is also imparted between the plate portion 74 and the upper plate portion 77. Yet further, the cavity 80 is provided on a predetermined spot of the above-mentioned rib 76 in the circumferential direction, and the above-mentioned flexibility is further enhanced. Therefore, the impact force when the protruding portion 55 of the float 50 collides with the receiving portion 81 of the movable valve 70 is weakened more, whereby a damage on the receiving portion 81 of the movable valve 70 can be prevented more effectively.

Note that the float valve device of the present invention can be applied: not only to the float valve device as described above, which is configured so as to dissipate the fuel vapor in the fuel tank of the automobile to the canister, to prevent the fuel from flowing outside of the fuel tank by closing the opening portion when the height of the liquid level of the fuel exceeds the predetermined value, and to regulate the fuel tank from being filled up at the time of refueling; but also to, for example, a cutoff valve and the like.

EXAMPLES

With regard to the float valve device illustrated in FIG. 1 to FIG. 8C, experimentally made were: ones (Example 1) in each of which the inner diameter of the center hole 83 of the receiving portion 81 of the movable valve 70 was set at 3 mm; and ones (Example 2) in each of which the inner diameter of the center hole 83 was set at 3 mm in the same way, and the center hole 83 was made as the through hole as illustrated in FIG. 6D.

Note that glass fiber reinforced aromatic Nylon (glass fiber content: 30%) was used as a material of the housing 20, the float 50, and the movable valve 70. Further, with regard to a size of the float 50, an outer diameter thereof was set at 29 mm, a length thereof was set at 75 mm, a weight thereof was set at 45 g. A thickness of the annular protruding portion 82 of the receiving portion 81 of the movable valve 70 was set at 2.1 mm, and a thickness of the outer circumference of the center hole 83 was set at 0.8 mm.

Meanwhile, ones (Comparative example) were made experimentally, in each of which, though a structure was the same as that of the float valve device illustrated in FIG. 1 to FIG. 8C, the center hole 83 was not provided in the receiving portion 81 of the movable valve 70, and only the guiding recessed portion 84 was formed.

A test of dropping a sample from a height of 1 m was performed for the float valve devices of the above-mentioned Examples 1 and 2 and Comparative example. This test was performed three times for the float valve devices of each example.

As a result, while the cracks were observed in the receiving portions 81 of all the samples as the float valve devices of Comparative example, no crack was observed in any of the samples as the float valve devices of Examples 1 and 2.

Further, a similar test to the above was performed for samples as the float valve devices of Examples 1 and 2 while increasing a dropping height to 1.5 m. Then, no crack was observed in any of the samples in both of Examples 1 and 2.

What is claimed is:

1. A float valve device, comprising:
a housing which has a cylindrical shape, and which is separated into a lower space and an upper space through an intermediation of a partition wall, wherein an air pipe that allows the upper space to communicate with an outside thereof is attached to an outer wall of the upper space, an opening portion is provided in the partition wall, a valve seat is formed on a lower surface of the opening portion, and a communication hole that allows the lower space to communicate with an outside thereof is formed in an outer wall of the lower space;
a float which is disposed in the lower space of the housing to be vertically slidable, which has a protruding portion provided on a center of an upper surface thereof, and which comes up by a liquid flowing through the communication hole of the housing, wherein the protruding portion is formed so that a center thereof is highest, and a periphery thereof becomes gradually lower from the center; and
a movable valve which is supported on an upper portion of the float to be freely swingable with respect to the float, wherein the movable valve includes a movable valve main body and an elastic valve member mounted on an upper portion of the movable valve main body, and wherein a receiving portion is provided on a lower surface of the movable valve main body,
wherein the receiving portion includes an annular protruding portion that protrudes from the lower surface of the movable valve main body, a center hole formed in a center of the annular protruding portion, and a guiding recessed portion which is provided between the center hole and the annular protruding portion, wherein the guiding recessed portion is a tapered portion that starts from an open periphery of the center hole such that the guiding recessed portion starts with an inner circumference periphery at a side of the center hole and the guiding recessed portion becomes gradually shallower from a side of the inner circumference periphery toward an outer circumference periphery of the guiding recessed portion at a side of the annular protruding portion, wherein when the float comes up to a predetermined height, the movable valve abuts on the valve seat to thereby close the opening portion and the periphery of a top portion of the protruding portion of the float abuts on the inner circumference periphery of the guiding recessed portion without the top portion of the protruding portion of the float abutting on the movable valve, and wherein a value of an angle of the tapered portion of the guiding recessed portion is less than a value of an angle of a tapered portion of the periphery of the top portion of the protruding portion of the float, such that the periphery of the to portion of the protruding portion of the float maintains linear contact with the inner circumference periphery of the guiding recessed portion even when the protruding portion of the float abuts obliquely on the receiving portion of the movable valve.

2. The float valve device according to claim 1, wherein an inner bottom surface of the center hole is closed.

3. The float valve device according to claim 1, wherein the center hole penetrates a plate portion on which the receiving portion of the movable valve main body is formed.

4. The float valve device according to claim 1, wherein the movable valve main body comprises a plate portion on which the receiving portion is formed, and an upper plate portion that is formed above and substantially parallel to the plate portion through an intermediation of a rib, wherein the upper plate portion and the elastic valve member constitute a sealing surface, and wherein a lightening recessed portion is formed in the rib.

5. The float valve device according to claim 4, wherein a cavity is provided in a predetermined spot of the rib in a circumferential direction.

6. The float valve device according to claim 1, wherein the movable valve main body comprises a plate portion on which the receiving portion is formed, and an upper plate portion that is formed above and substantially parallel to the plate portion through an intermediation of a rib, wherein the upper plate portion and the elastic valve member constitute a sealing surface.

7. The float valve device according to claim 6, wherein a cavity is provided in a predetermined spot of the rib in a circumferential direction.

\* \* \* \* \*